J. FISHER.
EARTH-AUGERS.
No. 195,356. Patented Sept. 18, 1877.
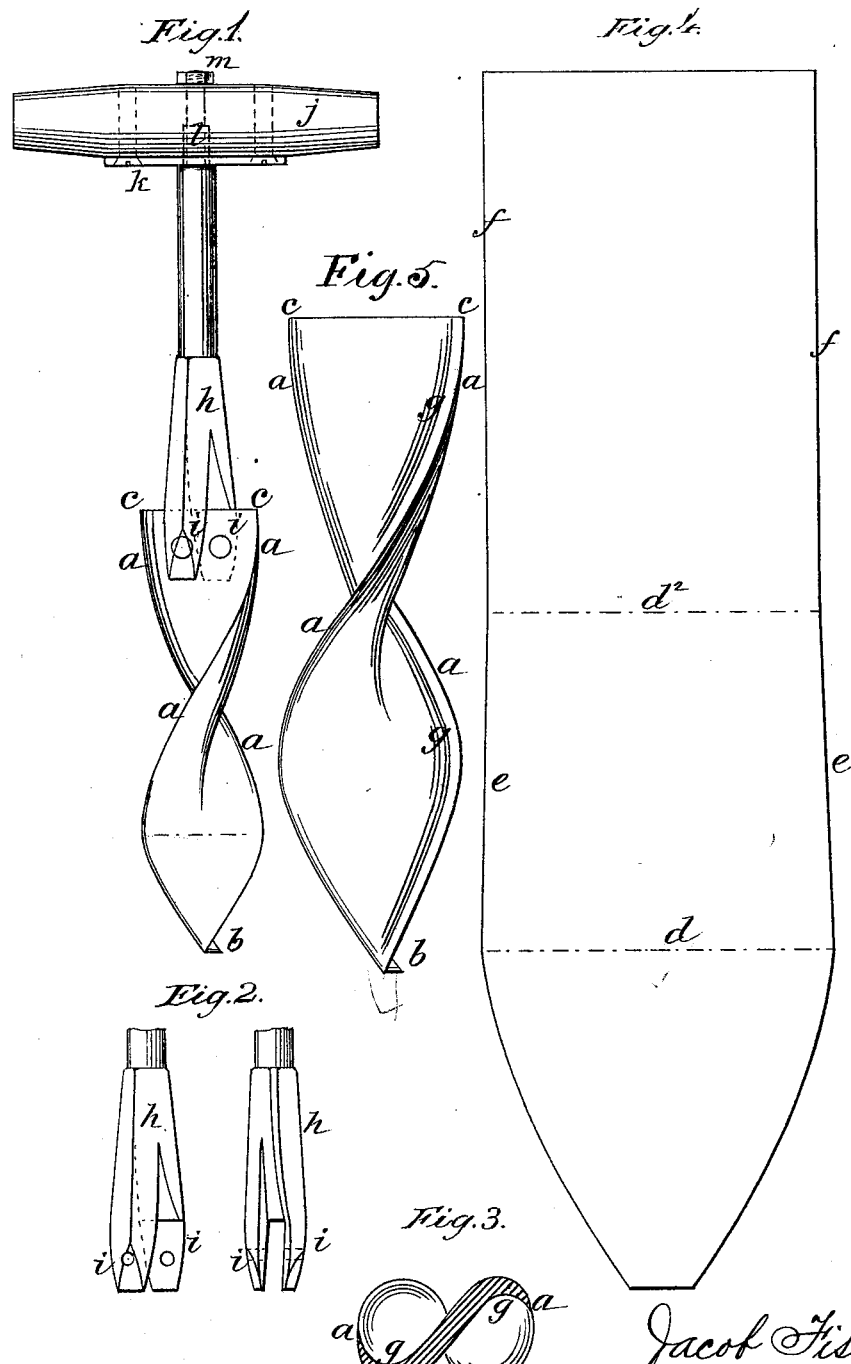
Jacob Fisher
Inventor;
by Johnson & Johnson
Att'ys
Witnesses:

UNITED STATES PATENT OFFICE.

JACOB FISHER, OF OTTAWA, KANSAS.

IMPROVEMENT IN EARTH-AUGERS.

Specification forming part of Letters Patent No. 195,356, dated September 18, 1877; application filed August 3, 1877.

*To all whom it may concern:*

Be it known that I, JACOB FISHER, of Ottawa, in the county of Franklin and State of Kansas, have invented certain new and useful Improvements in Earth-Boring Augers for Post-Holes; and I do hereby declare that the following is a full, clear, and exact description thereof, which will enable others skilled in the art to which it appertains to make and use the same, reference being had to the accompanying drawings, and to letters of reference marked thereon, which form a part of this specification.

In adapting the auger for boring holes for fence-posts, I have aimed to save labor and time in effecting the work by one man.

To this end I have constructed the auger body or web with two deep gutters, terminating in spiral cutting-edges of great pitch, or extending from the point to the top, with a fold of about half a circle, and terminating with a full flat width at the shank-connection.

A peculiarity of such blade consists in having its greatest width a short distance above the entering-point, the edges then tapering upward a short distance to a point from which they extend parallel to the top, thereby causing the auger to work much easier, and to clean the earth out of the hole better, and make a better-shaped hole, saving the labor of subsequently trimming it to put in the post. This construction also renders the auger lighter, so that it can be worked by one man.

The curved gutters along the cutting-edges are quite deep and are on opposite sides of the middle of the blade, to form a better hold for the earth, and to raise it better over the body or web between the cutting-edges. This is important in connection with the long pitch of the cutting-edges.

The blade at its upper end terminates with its full flat width, for the attachment thereto of the shank by a forked end, in which the laps are diagonal to each other, and secured by separate rivets, in a manner to give a firm bracing hold and union of the blade with the shank.

The attachment of the shank to the handle is made by a plate fitting the square portion of the screw-threaded stem and secured to the under side of the handle, making a very strong and simple connection.

With this implement one man can bore about twenty-five holes in one hour. In such implements this is a matter of much importance.

In the drawings, Figure 1 represents an earth-boring auger embracing my invention; Fig. 2, the shank, showing its diagonal forked ends; Fig. 3, a cross-section of the auger-blade; Fig. 4, a diagram, showing the varying width, in outline, of the cutting-edges; and Fig. 5, the auger-blade enlarged.

The blade is formed with two cutting-edges, $a\ a$, rising from a point, $b$, and, making about a half-circle, they terminate in full width at the points $c\ c$ with a straight cross-top.

At a point about five inches from the entering point $b$, the blade has its greatest width, as at the line $d$; and from this point for about the same distance the edges taper slightly to the line $d^2$, so as to be within the width of its greatest part, as indicated by the lines $e\ e$ in the diagram.

From the termination of the taper the edges $f$ continue to the top parallel to each other. The effect of this construction is to bring the hardest work upon that portion of the cutting-blades having the greatest width, and at a short distance from the point, while the intermediate tapering portions allow the upper parallel edges to have a much better effect in cleaning out the earth without binding contact with the walls of the hole, and give a clean cut at its top.

The acting sides of the spiral edges are made with continuous short curves or gutters, as shown in the cross-section; and the spaces between the folds or vanes $i$ of the spiral cutting-blade are comparatively open from the bottom to the top, and by this means prevent the crowding of the earth, as in such augers in which the vanes are of slight pitch with a gradually-increasing space upward between the vanes.

I have, in effect, reversed the former construction of earth-augers in this particular, and effect the holding and upward movement of the earth by the short curves or gutters $g$ on the inner or acting sides of the blades, and running along their length, as shown in Fig. 3. This form gives an easy cut, and holds the earth well.

The shank of the handle is forked in an enlargement, $h$, with the laps $i$ $i$ standing obliquely to each other, to receive the upper end of the blade between them, and to be riveted thereto by separate rivets passing through each lap. This forms a very strong brace and firm union of the parts. The ends of the laps are on the opposite side of the blade, and are tapered at the points, so as not to hinder the raising of the earth.

The connection of the handle $j$ with the shank is made by a plate, $k$, fitting upon a square-shouldered stem, $l$, screwed to the under side of said handle, and a nut, $m$, on the upper threaded end of the stem, screwed hard upon said handle, making a firm brace and clamp for the handle and shank.

The auger may be made of any size, and the point may have a slight entering-lip.

I claim—

1. An earth-auger blade or pod having long spiral cutting-edges $a$ and grooves $g$ throughout its entire length, as and for the purpose described.

2. An earth-auger blade or pod consisting of long spiral cutting-edges having their greatest width a short distance above the point, then tapering a short distance, from the termination of which taper said edges extend parallel to the top, for the purpose described.

3. The obliquely-forked shank, in combination with an auger-blade terminating with a full flat width at the shank-connection, for the purpose described.

In testimony that I claim the foregoing I have affixed my signature in the presence of two witnesses.

JACOB FISHER.

Witnesses:
J. SUMSTINE,
PETER KAISER.